350-96.1 SR

XR 3,553,366

SEARCH ROOM

United St...

[11] 3,553,366

SUBSTITUTE FOR MISSING XR

[72] Inventor Frans Brouwer
Glencoe, Ill.
[21] Appl. No. 762,389
[22] Filed Sept. 25, 1968
[45] Patented Jan. 5, 1971
[73] Assignee Stewart-Warner Corporation
Chicago, Ill.
a corporation of Virginia

[54] FACSIMILE FIBER OPTICS SCANNER ASSEMBLY
10 Claims, 5 Drawing Figs.

[52] U.S. Cl. .......... 178/7.6, 178/6, 178/71, 346/139
[51] Int. Cl. .......... H04n 1/14
[50] Field of Search .......... 178/6LCR, 7.6, 7.1E; 346/139A

[56] References Cited

UNITED STATES PATENTS

| | | | |
|---|---|---|---|
| 1,844,508 | 2/1932 | Jenkins | 178/6LC |
| 2,864,886 | 12/1958 | Lemmon | 178/6LC |
| 3,235,660 | 2/1966 | Treseder | 178/6LC |
| 3,240,106 | 3/1966 | Hicks | 178/6LC |
| 3,249,692 | 5/1966 | Clay | 178/6LC |
| 3,379,832 | 4/1968 | Judin | 178/6LC |

*Primary Examiner*—Robert L. Richardson
*Assistant Examiner*—Joseph A. Orsino, Jr.
*Attorneys*—Augustus G. Douvas, William J. Newman and Norton Lesser

ABSTRACT: An optical scanner assembly having an endless movable timing belt assembly and a plurality of optical scanner units mounted on the timing belt assembly for movement therewith in scanning copy material. Flexible light pipe means extend between each of the optical scanner units and a single photocell means for receiving the projected images of object areas on the copy material and transmitting the same therethrough to the photocell means. Additional flexible light pipe means extend between a single light source means and each of the optical scanner units for receiving light from the light source means and transmitting the same therethrough to illuminate object areas of copy material being scanned. The light source means comprises a light source and auxiliary light pipe means.

Inventor:-
Frans Brouwer,
By
Atty.

FACSIMILE FIBER OPTICS SCANNER ASSEMBLY

BACKGROUND OF THE INVENTION

1. Field of the Invention

The present invention pertains generally to facsimile apparatus for use in wire transmission of graphic data, and more particularly to an improved optical scanner assembly for use in such apparatus.

2. Description of the Prior Art

In a typical optical facsimile system, elemental areas of copy material are successively scanned in a transmitter, and images from the scanned material are converted by an optical system into electrical signals for transmission to a receiver. At the receiver, electrical signals from the transmitter are converted to printing current and passed through associated printer contact means and a linear printer bar to produce on intervening moist electrolytic recording paper an image of the transmitted copy.

One type of facsimile apparatus adapted for use as a transmitter or receiver is disclosed and claimed in the copending application of Frans Brouwer and Frank L. Sobchak, Ser. No. 613,545, filed Feb. 2, 1967. This apparatus embodies an optical scanner assembly comprised of drive and idler pulley assemblies, a timing belt assembly trained about the pulley assemblies, and three combined optical scanner and printer contact units, each including an optical scanner and printer contact means, mounted on the timing belt assembly for movement therewith in a continuous closed path. In the transmission mode of operation, the optical scanners are moved successively across copy material to be scanned, while in the receiving mode, the printer contact means are moved successively across recording paper lengthwise of the printer bar.

In the aforesaid optical scanner assembly, each optical scanner is comprised of an elongated hollow lens holder with a lens mounted in the forward end thereof and a photocell mounted at the rearward end thereof for receiving the projected images of object areas on the copy material. Additionally, light source means, in the form of a pair of lamp bulbs, are carried by each of the optical scanner units at the forward end of the lens holder for illuminating object areas of copy material being scanned. With this arrangement of three optical scanner units, three separate photocells, and three pairs of lamp bulbs, are required. In these particulars, an optical scanner assembly of this nature is not as inexpensive to fabricate and assemble as might be desired for certain applications.

SUMMARY OF THE INVENTION

In accordance with the present invention, which is concerned with an optical scanner assembly of the general type described above, flexible light pipe means are connected to each of the optical scanners and extend to a single photocell. The light pipe means serve to receive the projected images of object areas on copy material and to transmit the same therethrough to the photocell. Additional light pipe means are arranged between the optical scanners and a single light source means. Light from the light source means is directed into the additional light pipe means and is transmitted therethrough to illuminate object areas of copy material being scanned.

More particularly, a rotor assembly is mounted centrally of the timing belt assembly for rotation in synchronism with movement of the optical scanners. The ends of the light pipe means remote from the optical scanners are carried by the rotor assembly, and the photocell and light source means are stationarily mounted relative to the rotor assembly. The light source means comprises a lamp bulb and auxiliary light pipe means for transmitting light from the bulb to the ends of the additional light pipe means carried by the rotor assembly. In one embodiment, the auxiliary light pipe means is of uniform cross section throughout its length, and a parabolic reflector is used to concentrate light, emitted by the bulb, on the adjacent end of the auxiliary light pipe means. In another embodiment, the end of the auxiliary light pipe means adjacent the lamp bulb is larger in cross section than the remainder of the auxiliary light pipe means, and light is thereby intensified in brightness as it is transmitted from the large end of the auxiliary light pipe means to the other end thereof thus permitting a low power lamp bulb to be employed. The several light pipe means each comprise a flexible optical fiber unit which may be in the form of either a single optical fiber or a bundle of optical fibers.

With the foregoing arrangement of the optical scanner assembly of the present invention, the number of photocells required is reduced to one, and the number os lamp bulbs required is likewise reduced to one. As a consequence, fabrication and assembly costs are reduced, and improved operational reliability is achieved.

DESCRIPTION OF THE PREFERRED EMBODIMENTS

Figure 1:
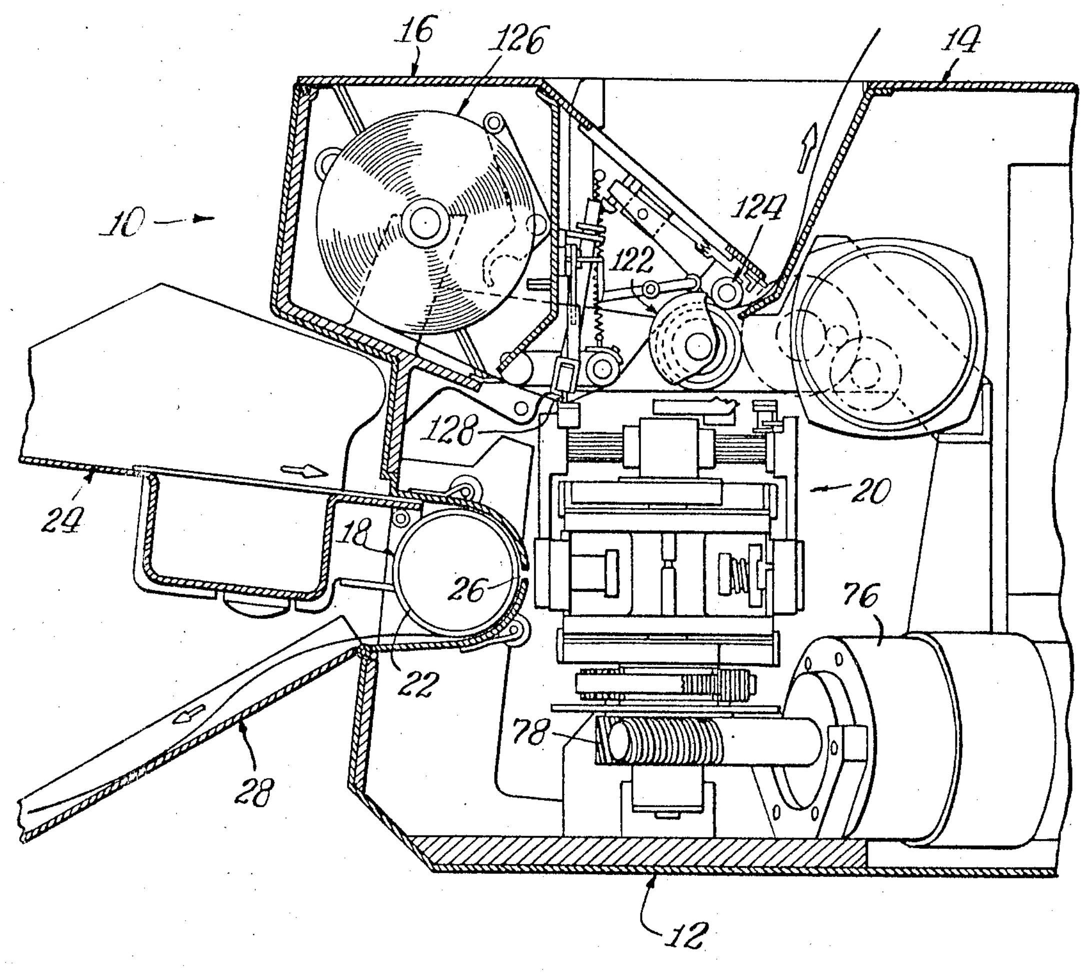
FIG. 1 is a view, partly in section and partly in elevation, of the front portion of a facsimile transceiver incorporating the fiber optics scanner assembly of the present invention.

Referring now to FIG. 1, there is indicated generally by the reference numeral 10 one type of facsimile apparatus—a facsimile transceiver—in which the fiber optics scanner assembly of the present invention may be incorporated. The facsimile transceiver 10 comprises a main frame 12 enclosed by a cover assembly 14 and a top door assembly 16.

Figure 2:
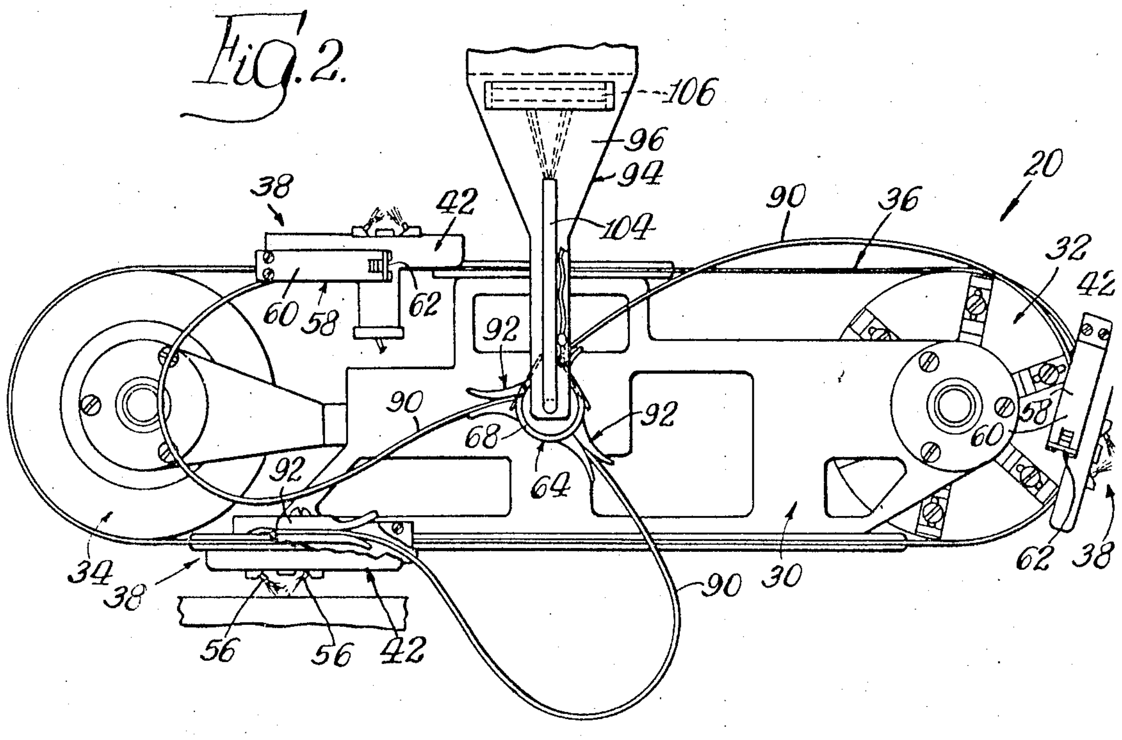
FIG. 2 is a plan view, on an enlarged scale, of the fiber optics scanner assembly incorporated in the facsimile transceiver of FIG. 1.
Figure 3:
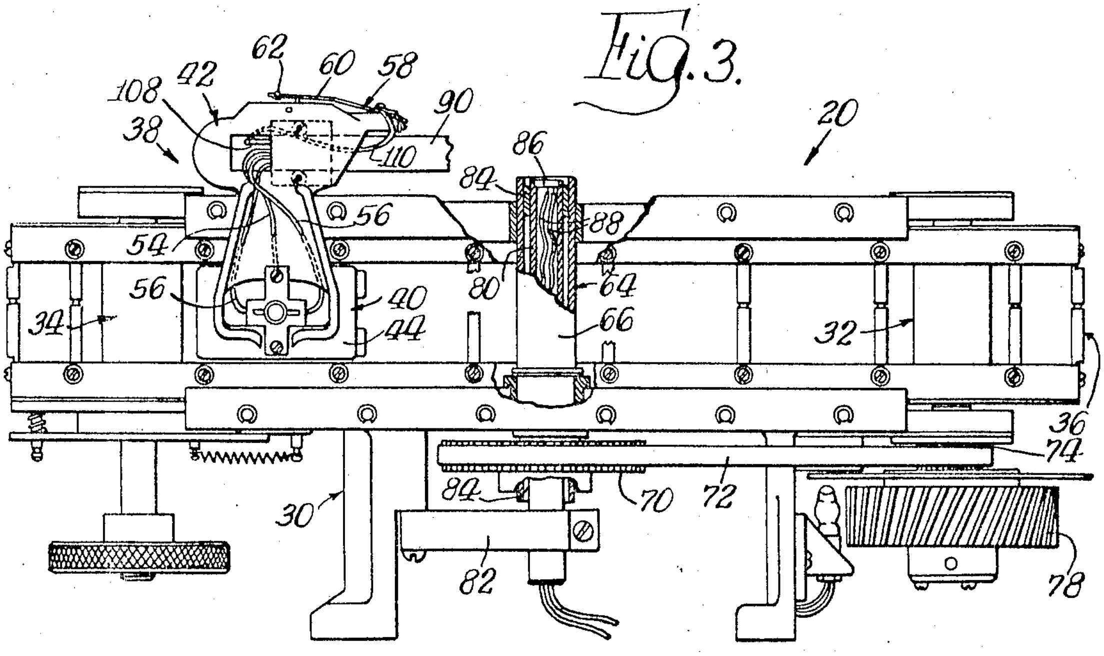
FIG. 3 is a side elevational view of the fiber optics scanner assembly of FIG. 2, with portions being broken away and shown in section.
Figure 4:
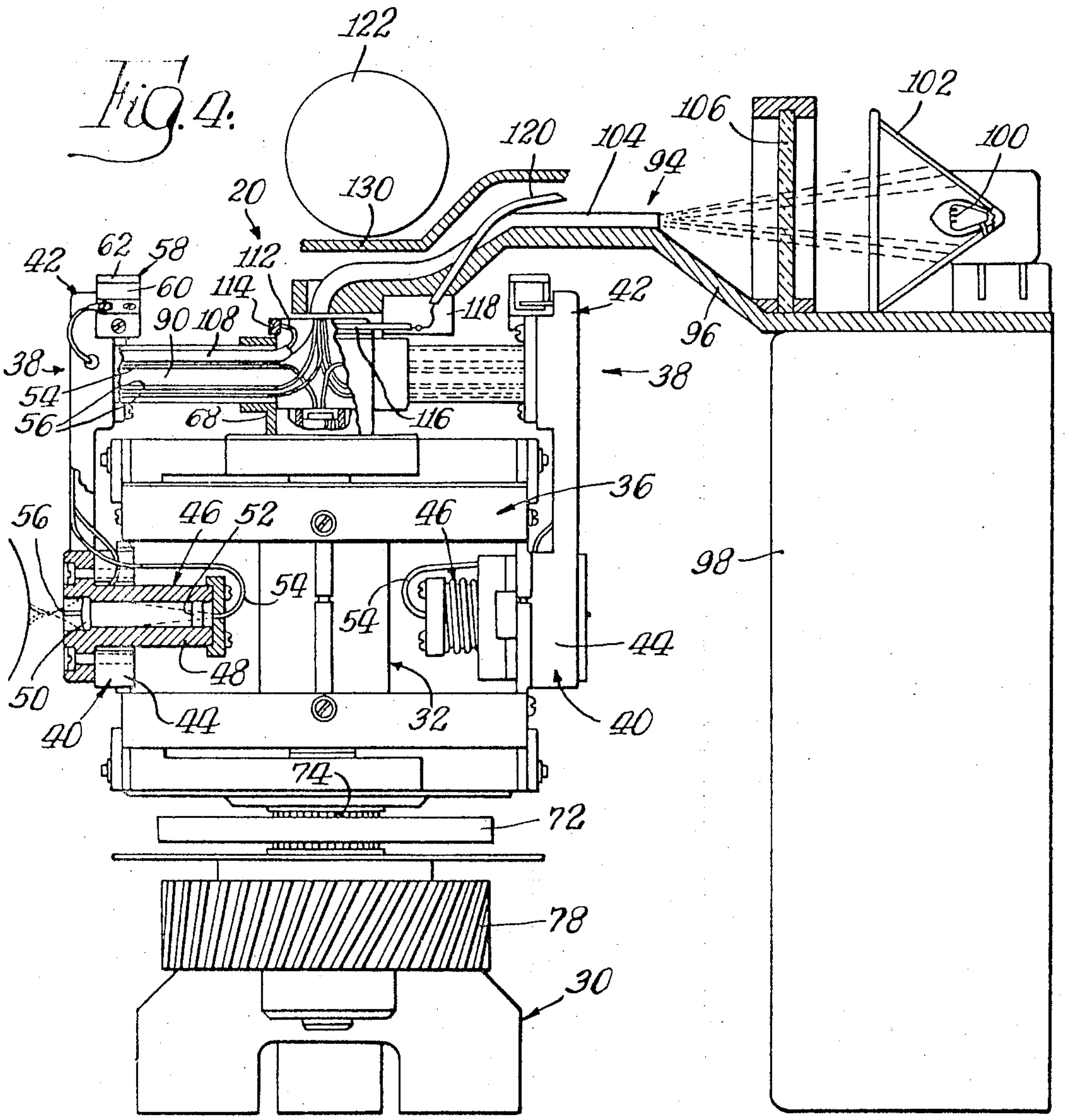
FIG. 4 is an end elevational view of the fiber optics scanner assembly of FIG. 2, with portions being broken away and shown in section.

Operable in the transmission mode of the facsimile transceiver 10 are a copy feed mechanism indicated generally at 18 and the scanner assembly of the present invention indicated generally at 20. The copy feed mechanism 18 includes a transverse power driven copy feed roller 22 which draws copy material from a copy feed tray 24, feeds the copy material past a longitudinal scanning slot 26, and discharges the same onto a tray 28. The scanner assembly 20 extends parallel to the copy feed roller 22, and as shown in FIGS. 2—4, includes frame means 30, drive and idler pulley assemblies 32 and 34, a timing belt assembly 36 trained about the pulley assemblies 32 and 34, three combined scanner and printer contact units 38 carried by the timing belt assembly 36, and associated synchronizing and electrical transmission means.

Each scanner and printer contact unit 38 includes a lower optical scanner carriage assembly 40, and an upwardly extending carriage and contact assembly 42. The scanner carriage assembly 40 comprises a scanner carriage 44 which carries an optical scanner 46 having an elongated hollow lens holder 48 (FIG. 4). The forward end of the lens holder 48 faces outwardly of the timing belt assembly 36 and the rearward end thereof faces inwardly of the belt assembly. Mounted within the lens holder 48 are a double convex lens 50 and a filter 52, and connected in the rearward end of the lens holder 48 is the one end of light pipe means in the form of a single flexible optical fiber unit 54 which serves to receive the projected images of object areas on copy material being scanned. Carried at the forward end of the lens holder 48 is the one end of additional light pipe means in the form of a pair of flexible optical fiber units 56 (FIG. 3) which serve as a scanning light source means. As will be appreciated, a separate group of three optical fiber units, comprised of one unit 54 and two units 56, are associated with each of the three scanner units 38. Additional details concerning the construction and function of the optical fiber units 54 and 56, and their relationship to other components of the scanner assembly 20, will be discussed hereinafter. For printout operation, each carriage and contact assembly 42 has mounted at the upper end thereof a printer contact assembly 58 comprised of an elongated strip or leaf member 60 and a contact element 62 in the form of a cylindrical pin member.

Rotatably mounted centrally of the scanner frame means 30 is a rotor assembly 64 which includes a vertical tubular shaft 66 and a hollow distributor head 68 press fitted on the upper end thereof. Secured to the lower end of the tubular shaft 66 is a toothed pulley 70. A toothed rubber belt 72 is trained about the pulley 70 and a toothed pulley 74 associated with the drive pulley assembly 32. A driving connection is thereby established between the drive pulley assembly 32 and the tubular shaft 66 whereby the rotor assembly 64 is rotated in the same direction and at the same speed in r.p.m. as the timing belt assembly 36. A motor 76 (FIG. 1) is arranged to drive a gear 78 at the lower end of the drive pulley assembly 32. Referring back to FIG. 3, a stationary sleeve member 80, which is secured at its lower end in a clamp member 82 suitably connected to the scanner frame means 30, extends into the tubular shaft 66 concentrically thereof. Suitable bearings 84 are arranged intermediate of the tubular shaft 66 and the sleeve member 80 whereby to positively locate the sleeve member 80 while accommodating rotation of the tubular shaft 66 relative to the stationary sleeve member 80. Mounted in the upper end of the sleeve member 80 adjacent the lower side of the distributor head 68 is a photocell 86. Conductors 88 are connected at their one ends to the photocell 86, extend downwardly through and outwardly of the sleeve member 80, and are adapted to be connected to a preamplifier unit and other electrical components (not shown) of the transceiver 10.

The aforesaid groups of optical fiber units 54 and 56 associated with the scanner and printer contact units 38 lead upwardly to, and are incorporated in, three separate flat flexible ribbon cables 90 which extend individually between each unit 38 and the distributor head 68. Suitable guide members 92 (FIG. 2) with divergent arms are secured to the units 38 and the distributor head 68 adjacent the opposite ends of the ribbon cables 90 to prevent sharp flexure or bending thereof during rotation of the timing belt assembly 36 and the distributor head 68. At the rotor assembly 64, the optical fiber units 54 (three in number), and the optical fiber units 56 (six in number), project beyond the ends of the cables 90 and into the distributor head 68 as shown in FIG. 4. The ends of the optical fiber units 54 carried by the distributor head 68 face outwardly of the lower end thereof in the direction of the photocell 86, while the ends of the optical fiber units 56 carried by the distributor head 68 face outwardly of the upper end thereof. These ends of the optical fiber units 56 are positioned together to receive light from a single stationary light source means 94 mounted on a bracket 96 supported by a frame member 98 secured to the main frame 12. The light source means 94 comprises a light source in the form of a lamp bulb 100 disposed within a parabolic reflector 102, and auxiliary light pipe means in the form of a flexible optical fiber unit 104 extending along the top side of the bracket 96. The optical fiber unit 104 at one end is arranged to receive light projected from the lamp bulb 100, and at the other end terminates adjacent the distributor head 68 for directing light transmitted there through into the adjacent ends of the optical fiber units 56. If necessary, a heat absorbing glass disc 106 may be interposed between the lamp bulb 100 and the adjacent end of the optical fiber unit 104.

Each of the optical fiber units 54, 56 and 104 may comprise an individual fiber or a number of fibers clustered together in a bundle. Fibers of a glass or plastic in a wide range of thicknesses may be used. In principle, light entering one end of a fiber is transmitted to the other end by a process of total internal reflection. To prevent leakage from a fiber, it may be insulated with a coating of lower refractive index than that of the fiber. In practicing the present invention, it has been found satisfactory to use a single fiber of 10 mils diameter for each of the optical fiber units 54, a single fiber or a cluster of fibers each of 10 mils diameter for each of the optical fiber units 56, and a bundle of fibers each of 10 mils diameter for the optical fiber unit 104. Preferably, fiber units 54 and 56 are fabricated of a plastic such, for example, as polymethyl methacrylate. To provide concurrent and equal illumination of the optical fiber units 56, the optical fiber unit 104 is preferably of such thickness that the end thereof at the distributor head 68 overlies or extends across all of the adjacent ends of the six optical fiber units 56 grouped together in the distributor head. During operation of the scanner assembly 20, the scanner units 38 while following their prescribed orbital path cyclically move toward and away from the distributor head 68, and the optical fiber units 54 and 56 are correspondingly cyclically flexed between the scanner units and the distributor head. By incorporating these optical fiber units in the ribbon cables 90 between the scanner units and the distributor head as noted above, fatigue of the fibers resulting from flexure in these circumstances is substantially eliminated.

Also incorporated along or inside each ribbon cable 90 is a copper strip 108 which at one end (FIG. 3) is connected through a conductor 110 to the printer contact member 60 and which at its other end (FIG. 4) is connected by a conductor 112 to a slip ring 114 mounted on the distributor head 68. The slip ring 114 is engaged by a brush 116 which is carried by a brush block 118 mounted at the underside of the bracket 96. The brush 116 is electrically connected to other electrical components (not shown) of the transceiver 10 by a conductor 120. The foregoing arrangement is used to transmit printing current to the three printer contact members 60 from the conductor 120 during operation of the scanner assembly 20 in the receiving mode which will be described hereinafter.

When the gear 78 is rotated, the pulley assemblies 32 and 34 and the timing belt assembly 36 are correspondingly rotated, and the optical scanner carriage assemblies 40 are accordingly moved in a continuous closed path, a portion of which extends parallel to the copy feed roller 22. At the same time, the rotor assembly 64 and the distributor head 68 are rotated to accommodate movement of the ribbon cables 90 with the optical scanner carriage assemblies 40. In the transmission mode, as copy material is drawn about the copy feed roller 22, it is traversed successively by the optical scanners 46 and thereby scanned, line by line an elemental area at a time. More particularly, light from the lamp bulb 100 is received by the auxiliary optical fiber unit 104, transmitted therethrough and directed into the ends of the additional optical fiber units 56 which are rotating with the distributor head 68. The light thus received by the additional optical fiber units 56 is transmitted therethrough and projected outwardly of the ends thereof at the optical scanners 46 for illuminating object areas of the copy material being scanned. The projected images of object areas on the copy material are received by the ends of the optical fiber units 54 connected in the optical scanners 46. These images are transmitted through the optical fiber units 54 and are projected from the other ends of the latter, which are rotating with the distributor head 68, onto the single stationary photocell 86. The images received by the photocell 86 are converted to electrical signals by suitable circuitry (not shown) and these signals are sent to another transceiver or other suitable facsimile recording device for reproduction of the original copy material. For further details concerning the general construction and operation of the copy feed mechanism 18, and of those components of the scanner assembly 20 which do not directly form part of the present invention, reference may be had to the aforesaid copending application of Frans Brouwer and Frank L. Sobchak.

In the receiving mode of the facsimile transceiver 10, electrical signals received from another transmitter are converted to printing current by suitable circuitry. This current is transmitted through the conductor 20, the brush 116, the slip ring 114, the copper strips 108 and the conductors 110 to the printer contact members 60 for printout. As shown in FIG. 1, suitable printout mechanism comprises a transverse power driven combined drive and heat roller assembly 122 and an associated pressure roller 124 which together serve to draw moist electrolytic recording paper from a roll 126 past a printer bar 128, and issue the paper with reproduced data for viewing.

Arranged for cooperation with the printer bar 128 are the above described printer contact members 60. The printer bar 128 is disposed vertically above and in the straight line path of travel of the scanner and printer contact units 38 along one side of the scanner assembly 20. In the receiving mode, the printer bar 128 is biased downwardly and presses the paper from roll 126 downwardly into contact with the printer contact element 62 of the adjacent printer contact unit 38. As the timing belt assembly 36 is rotated, the printer contact units 38 are moved in the aforementioned closed path and the printer contact elements 62 are successively moved lengthwise of the printer bar 128. Printing current is passed through the associated printer contact elements 62, the recording paper, and the printer bar 128, and metal from the printer bar 128 is deposited on the recording paper and reacts with chemicals therein to produce an image of the transmitted copy. In this manner, copy is reproduced, line-by-line, an elemental area at a time, in synchronism with another transceiver or suitable transmitter in which copy material is being scanned. As the recording paper passes over the combined drive and heat roller assembly 122, it is dried and the electrolytic printing process is completed. To eliminate possible adverse effects of heat on the auxiliary optical fiber unit 104, a heat shield 130 is provided intermediate of the combined drive and heat roller assembly 122 and the auxiliary optical fiber unit 104. Further details of the construction and operation of the various components of the printout mechanism associated with the printer contact members 60 are disclosed in the aforesaid copending application of Frans Brouwer and Frank L. Sobchak.

Figure 5:
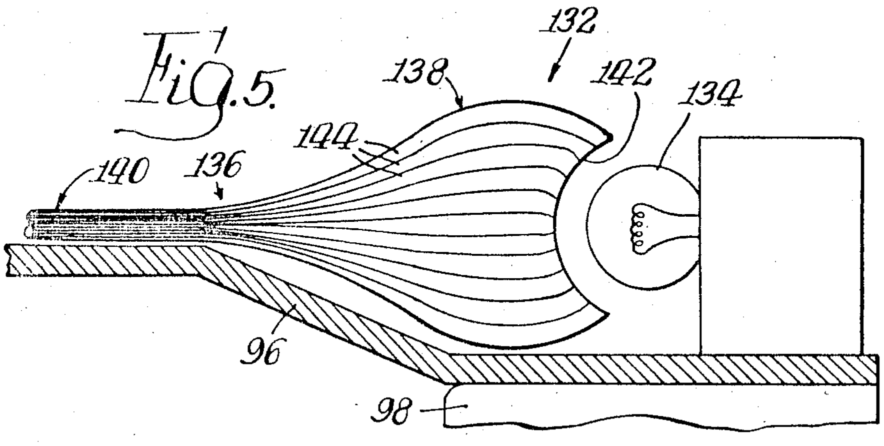
FIG. 5 is a view, on a further enlarged scale, of a modified embodiment of light source means for use with the fiber optics scanner assembly of FIGS. 1—4.

Referring now to FIG. 5, there is indicated generally by the reference numeral 132 a modified embodiment of light source means for use with the fiber optics scanner assembly 20 of FIGS. 1—4. The light source means 132 includes a lamp bulb 134 and auxiliary light pipe means in the form of an optical fiber unit 136 of varying circular cross section. The optical fiber unit 136 is formed with a large end section 138 which gradually merges into a main body portion 140 of reduced diameter. The end section 138 is provided with a concave semispherical socket 142 which is disposed to partially encompass the bulb 134 in radially equidistantly spaced close proximity thereto. The end of the main body portion 140 terminates, like the other embodiment of optical fiber unit 104, at the distributor head 68. The optical fiber unit 136 is fabricated of a bundle of optical fibers 144 which are first heated and fused and then drawn in both directions into the configuration shown in FIG. 5. The ends of the fibers 144 at the end section 138 turn slightly inwardly and, after the socket 142 has been suitably formed as by grinding, face the center of the radius of curvature of the socket. By reason of the reduction in overall diameter of the optical fiber unit 136, and the corresponding reduction in diameter of the individual fibers 144, from one end to the other, light emitted by the lamp bulb 134 is intensified in brightness while the same is transmitted through the optical fiber unit 136. Thus, with this arrangement, the use of either a reflector behind the lamp bulb 134, or a lens between the lamp bulb and the adjacent end of the optical fiber unit 136, is eliminated.

While there has been shown and described preferred embodiments of the present invention, it will be understood by those skilled in the art that various rearrangements and modifications may be made therein without departing from the spirit and scope of the invention.

I claim:

1. In facsimile apparatus having an endless movable timing belt assembly, a plurality of optical scanner units for successively scanning copy material, and means individually mounting the optical scanner units on the timing belt assembly for movement therewith in a continuous closed path at least a portion of which traverses the copy material, the improvement which comprises a single photocell, flexible optical fiber units extending between each of said optical scanner units and said photocell for receiving the projected images of object areas on the copy material and transmitting the same therethrough to said photocell.

2. The improvement of claim 1 including light source means, additional flexible optical fiber units extending between said light source means and each of said optical scanner units for receiving light from said light source means and transmitting the same therethrough to illuminate object areas of copy material being scanned.

3. In facsimile apparatus including an optical scanner assembly having frame means, a drive pulley assembly rotatably mounted in the frame means, means for rotating the drive pulley assembly, an idler pulley assembly rotatably mounted in the frame means, a timing belt assembly trained about the drive and idler pulley assemblies, a plurality of optical scanner units each including an optical scanner for scanning copy material, each of the optical scanners having an elongated hollow lens holder with the forward end thereof facing outwardly of the timing belt assembly and the rearward end thereof facing inwardly of the timing belt assembly and having a lens mounted in the forward end of the lens holder, and means individually mounting the optical scanner units on the timing belt assembly for movement therewith in a continuous closed path at least a portion of which traverses the copy material, the improvement which comprises a single photocell supported by said frame means, flexible optical fiber units with their one ends connected in said rearward ends of said lens holders and with their other ends extending to said photocell, and said optical fiber units serving to receive the projected images of object areas on the copy material and to transmit the same therethrough to said photocell.

4. The improvement of claim 3 including light source means, additional flexible optical fiber units with their one ends carried by said optical scanner units adjacent the forward ends of said lens holders and with their other ends extending to said light source means, and said additional optical fiber units serving to receive light from said light source means and to transmit the same therethrough to illuminate object areas of copy material being scanned.

5. The improvement of claim 3 including a rotor assembly rotatably mounted in said frame means, and means establishing a driving connection between said drive pulley assembly and said rotor assembly whereby the latter is rotated in the same direction and at the same speed in r.p.m. as said timing belt assembly; and wherein said other ends of said optical fiber units are carried by said rotor assembly, and said photocell is stationary.

6. The improvement of claim 5 including light source means extending to said rotor assembly, additional flexible optical fiber units with their one ends carried by said optical scanner units adjacent the forward ends of said lens holders and with their other ends carried by said rotor assembly, and said additional flexible optical fiber units serving to receive light from said light source means and to transmit the same therethrough to illuminate object areas of copy material being scanned.

7. The improvement of claim 6 wherein said rotor assembly includes a hollow distributor head, said other ends of said optical fiber units through which projected images of object areas are transmitted face outwardly of one end of said distributor head, said photocell is stationarily mounted adjacent said one end of said distributor head, said other ends of said additional optical fiber units face outwardly of the other end of said distributor head, and said light source means is stationarily mounted to direct light toward said other end of said distributor head into said other ends of said additional optical fiber units.

8. The improvement of claim 6 wherein said optical fiber units through which projected images of object areas are transmitted comprise single optical fiber units one each associated with each of said optical scanner units, said additional optical fiber units comprise pairs of optical fiber units one pair each associated with each of said optical scanner units, and each group of three optical fiber units are incorporated in separate flexible ribbon cables which individually extend between each of said optical scanner units and said rotor assembly.

9. The improvement of claim 6 wherein said light source means is comprised of a light source, and an auxiliary flexible optical fiber unit at one end arranged for receiving light projected from said light source and at the other end terminating adjacent said rotor assembly for directing light transmitted therethrough into said other ends of said additional optical fiber units.

10. The improvement of claim 6 wherein said light source means is comprised of a lamp bulb, and a bundle of optical fibers for intensifying the brightness of light as the same is transmitted therethrough, said bundle of optical fibers having one end section of large diameter with a socket adjacent said lamp bulb for receiving light emitted by the latter, and a main body portion of reduced diameter terminating adjacent said rotor assembly for directing light transmitted therethrough into said other ends of said additional optical fiber units.